United States Patent [19]

Isozumi

[11] Patent Number: 5,015,899

[45] Date of Patent: May 14, 1991

[54] ELECTROMAGNETIC SWITCH DEVICE WITH OPEN-ENDED PLUNGER

[75] Inventor: Shuzou Isozumi, Himeji, Japan

[73] Assignee: Mitsubishi Denki Kabushiki Kaisha, Tokyo, Japan

[21] Appl. No.: 522,776

[22] Filed: May 14, 1990

[30] Foreign Application Priority Data

May 15, 1989 [JP] Japan .................................. 1-121911

[51] Int. Cl.[5] ........................ H02K 7/118; F16H 3/44; F02N 11/00; F02N 15/06

[52] U.S. Cl. ....................................... 310/83; 310/256; 335/279

[58] Field of Search ................. 74/7 A; 290/38 R, 48; 310/23, 30, 83, 256; 335/126, 131, 236, 255, 279; 251/129.15

[56] References Cited

U.S. PATENT DOCUMENTS 3,221,190 11/1965 Bennett et al. ...................... 335/279
4,021,152 5/1977 Toyoda .......................... 251/129.15
4,538,129 8/1985 Fisher ................................. 335/236
4,816,712 0/1989 Tanaka ............................... 310/237

FOREIGN PATENT DOCUMENTS 1311876 11/1962 France .
52773 11/1982 Japan .

*Primary Examiner*—Steven L. Stephan
*Assistant Examiner*—D. L. Rebsch
*Attorney, Agent, or Firm*—Sughrue, Mion, Zinn, Macpeak and Seas

[57] ABSTRACT

An electromagnetic switch device for a starter motor has a plunger 21 defining a cylindrical body 22 slidably fitted in a sleeve 8, and a trumpet shaped intermediate plate 23 which generally extends in a plane perpendicular to the central axis of the cylindrical body. At least part of the cylindrical body has a thin-walled portion which extends in a direction opposite the extension direction of a cylindrical rod 24 driven by the plunger, from a junction 21a to the radially outer portion of the intermediate plate.

4 Claims, 5 Drawing Sheets

ELECTROMAGNETIC SWITCH DEVICE WITH OPEN-ENDED PLUNGER

BACKGROUND OF THE INVENTION

1. Field of the Invention

The present invention relates to an electromagnetic switch device used mainly for a coaxial electromagnetic switch device used mainly for a coaxial type starter device which starts an engine.

2. Discussion of Background

A coaxial type starter device for starting an engine is disclosed in Japanese Kokai No. 140864/1988, and will be described with reference to FIGS. 6 and 7.

An electromagnetic switch device 2 is attached to the rear end of a dc motor 1 in a coaxial starter device. The electromagnetic switch device 2 slidably moves a rotary output shaft and supplies a current from a battery to the dc motor 1 when a key switch (not shown) mounted on an automobile is closed. The electromagnetic switch device 2 comprises an exciting coil 7 and a plunger 9 as major elements, wherein the exciting coil 7 is formed by winding a wire around a bobbin 6 made of a resinous material held by front and rear cores 4, 5 which form a magnetic path in association with a casing 3. The plunger 9 has a cylindrical body 9*a* which is slidably disposed in a sleeve 8 fitted to the inner circumference of the bobbin 6.

In the plunger 9, an intermediate plate portion 9*b* is integrally formed inside the cylindrical body 9*a*. An end of a plunger rod 10 is connected to the central portion of the intermediate plate portion 9*b*. The other end of the rod 10 extends in a cylindrical armature rotary shaft from the rear end side of the dc motor 1. The plunger rod 10 transmits the movement of the plunger 9 to the rotary output shaft through an intermediate rod (not shown) disposed in the armature rotary shaft. A sleeve 11 is fitted to the plunger rod 10 at a position in the vicinity of the intermediate plate portion 9*b* of the plunger 9. A movable contact 13 is held in a slidable manner on the sleeve 11 through an insulating material 12.

In the electromagnetic switch device 2, the rear core 5 has a cylindrical portion 5*a* which is formed so as to cover the outer circumferential surface of the cylindrical body 9*a* of the plunger 9 and to be close to the outer circumferential surface of the cylindrical body 9*a* over its entire length when the plunger 9 is at a stationary position as shown in FIG. 6. The front end portion (an end portion facing the dc motor) of the cylindrical body 5*a* is formed in such a manner that it overlaps the rear end portion of the cylindrical body 9*a* in the radial direction when the plunger 9 is entirely shifted in the forward direction (toward the dc motor) as shown in FIG. 7.

The plunger 9 is attracted toward the front core 4 by a magnetic attraction force which is produced by a magnetic flux in a magnetic circuit which passes through the casing 3, the rear core 5, the plunger 9 and the front core 4, the magnetic circuit being produced by current conduction to the exciting coil 7. The movement of the plunger 9 in the forward direction projects the rotary output shaft from the frame of the coaxial type starter device by means of the plunger rod 10 and at the same time, the movable contact 13 held on the plunger rod 10 is brought into engagement with a fixed contact 14 placed at a predetermined position, whereby power is supplied to the dc motor 2.

The magnetic attraction force imparted to the plunger 9 (strictly speaking, to the cylindrical body 9*a*) in the conventional electromagnetic switch device 1 is shown as a curved line A in a graph as shown in FIG. 5 which shows a relation of the attracting force to a plunger gap (which is a distance indicated by g in FIG. 6). Generally, the magnetic attraction force imparted to the plunger 9 will become larger as the length of the gap g is reduced, i.e., the plunger 9 approaches the entirely shifted state. However, as is clear from the curved line A, a rate of increase of the attracting force decreases. A spring 15 is disposed in the electromagnetic switch device 1 in order to return the plunger 9 to the original stationary position. When the length of the gap g is reduced, the spring 15 is compressed, whereby the plunger 9, receives a great returning force. Accordingly, the magnetic attraction force has to be greater than the spring force in order to return the plunger 9 as the length of the gap g is reduced. In the conventional electromagnetic switch 1, however, the magnetic attraction force imparted to the plunger 9 was insufficient because the rate of increase of the attracting force reduces as the gap g is smaller. This caused a problem in that a predetermined attracting force could not be obtained when a voltage of a power source decreased.

SUMMARY OF THE INVENTION

It is an object of the present invention to provide an electromagnetic switch device capable of maintaining a predetermined magnetic attraction force without increasing the size of the device and even in a state where the gap between the plunger and the core becomes small.

The foregoing and other objects of the present invention have been attained by providing an electromagnetic switch device which comprises an exciting coil wound around a cylindrical bobbin, a sleeve fitted to the inner circumference of the cylindrical bobbin, a plunger disposed in the sleeve so as to be movable in the axial direction of the sleeve by a magnetic attraction force, a cylindrical rod which is movable in association with the plunger, and a movable contact attached to the cylindrical rod which comes to contact with a fixed contact when the plunger is moved forwardly by the magnetic attraction force, wherein the plunger comprises a cylindrical body which is slidably fitted to the sleeve and an intermediate plate portion which generally extends in a plane perpendicular to the central axial line of the cylindrical body, and wherein a part of the cylindrical body or the entirety of it has a thin-walled portion which extends at least in the direction opposite the extension of the cylindrical rod with respect to a joined portion to the radially outer portion of the intermediate plate portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
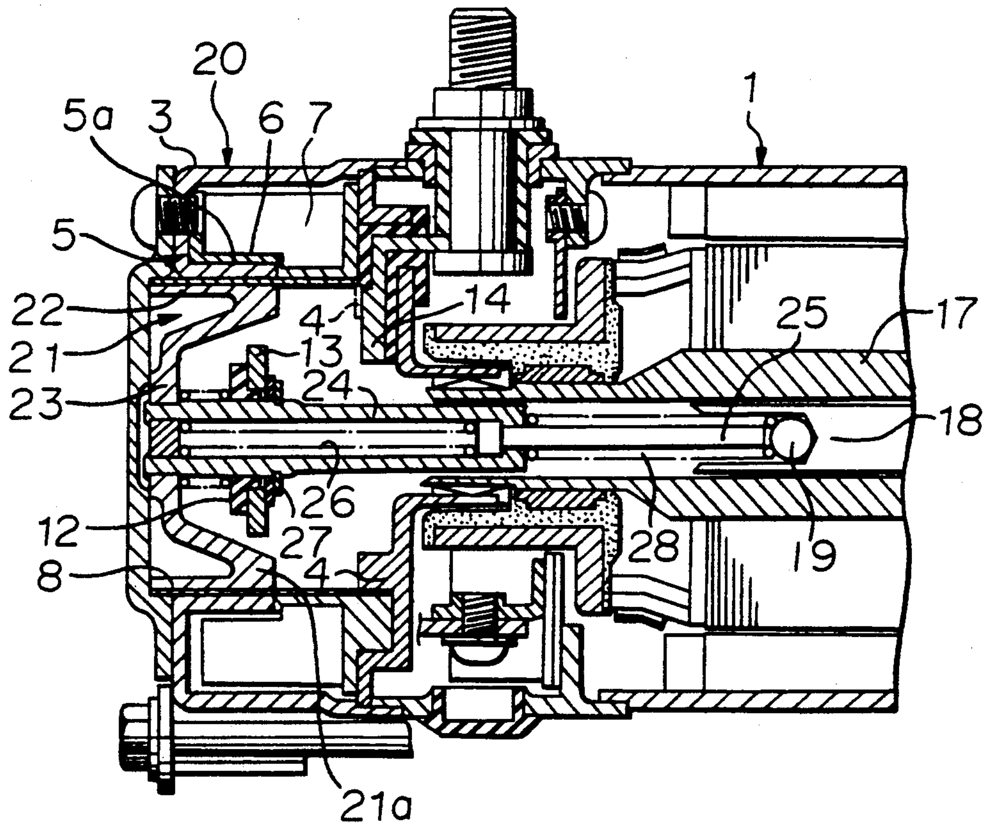
FIG. 1 is a longitudinal cross-sectional view partly broken of an embodiment of the electromagnetic switch device as a part of a coaxial type starter device according to the present invention.

Referring to the drawings wherein the same reference numerals designate the same or corresponding parts, preferred embodiments of the present invention will be described.

Before the explanation of the preferred embodiments of the present invention, description will be made as to a result of a study concerning the reason why the rate of increase of the attracting force reduces as the plunger 9 approaches the front core 4 in the conventional electromagnetic switch device 2.

Figure 6:
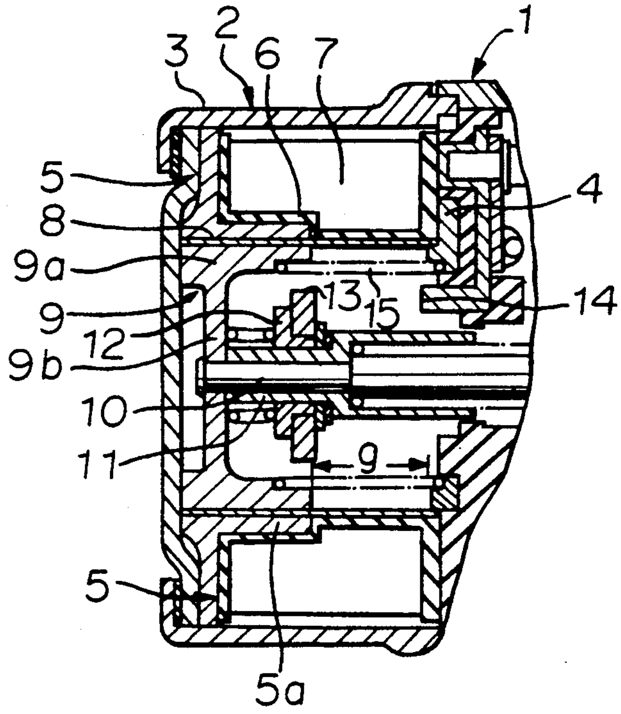
FIGURE 6 PRIOR ART
FIG. 6 is a longitudinal cross-sectional view partly broken of a conventional electromagnetic switch device which constitutes a part of a coaxial type starter device.
Figure 7:
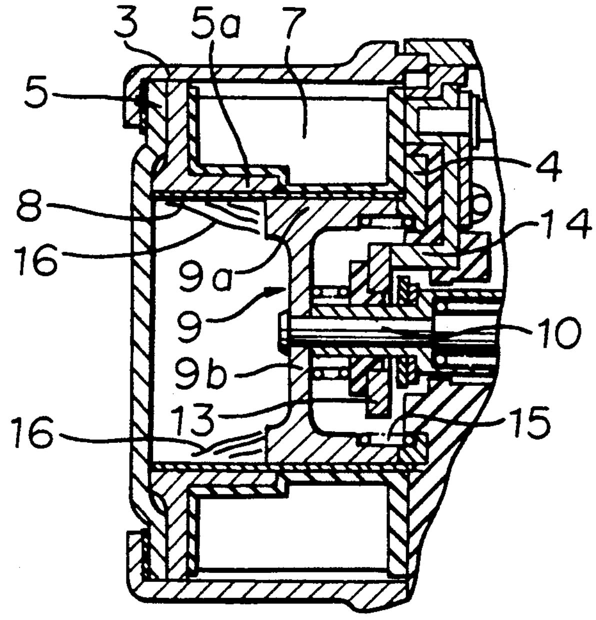
FIGURE 7 PRIOR ART
FIG. 7 is a longitudinal cross-sectional view of the conventional electromagnetic switch device as shown in FIG. 6, wherein a state of the plunger entirely moved is shown.

In the conventional electromagnetic switch device 2 (FIGS. 6 and 7), the cylindrical portion 5*a* of the rear core 5 is formed so as to come close to the outer circumferential surface of the cylindrical body 9*a* of the plunger 9 over the entire length of the cylindrical body 9*a*, when the plunger is at a stationary position, i.e. a retracted position (FIG. 6), and to cover the circumferential portion of the cylindrical body 9*a*. Accordingly, when the plunger 9 is moved forwardly, a magnetic flux as indicated by a reference numeral 16 in FIG. 7 is produced between the rear end portion of the cylindrical body 9*a* and the cylindrical portion 5*a* of the rear core 5. The magnetic flux 16 acts on the plunger 9 so as to pull back the plunger 9 by an attracting force in the opposite direction, whereby the attracting force to attract the plunger 9 forwardly is partially canceled by the opposite attracting force. Accordingly, the reduction in the rate of increased of the magnetic attraction force can be improved by eliminating the generation of the magnetic flux which results in the opposite attracting force.

In an electromagnetic switch device 20 according to a first embodiment of the present invention which is shown in FIG. 1, a plunger 21 comprises a cylindrical body 22 slidably disposed in a sleeve 8 and an intermediate plate portion 23 which is integrally formed or connected to the cylindrical body 22 so as to extend in general in a plane perpendicular to the central axial line of the cylindrical body 22 and which transmits the movement of the plunger 21 (strictly, the cylindrical body 22) to a cylindrical rod 24 (which is described hereinafter). The cylindrical body 22 has a thin-walled portion which extends backwardly with respect to a joint portion 21*a* which connects the radially outer portion of the intermediate plate portion 23. Namely, in the electromagnetic switch device 20 of this embodiment, the cylindrical portion 22 is connected to the radially outer portion of the intermediate plate portion 23 at an end facing toward the extension direction of the cylindrical rod 24, and the wall thickness of the cylindrical body 22 is reduced.

The intermediate plate portion 23 has a trumpet shape in cross section which opens toward the extension direction of the cylindrical rod 24. And the rear end of the cylindrical rod 24 made of non-magnetic stainless steel is fixed to the central aperture of the intermediate plate portion 23. The other end of the cylindrical rod 24 is inserted in a cylindrical armature rotary shaft for a dc motor 1 from its rear end side. A movable contact 13 is slidably mounted on the cylindrical rod 24 through an insulating material 12. A push rod 25 is disposed inside the cylindrical rod 24. A coil spring 26 is interposed between an end surface of the push rod 25 and the intermediate plate portion 23. The other end of the push rod 25 extends forwardly from an opening which opens at the front end of the cylindrical rod 24 so that the other end of the push rod 25 faces a steel ball 19 which is disposed at a recess formed at an end surface of a rotary output shaft 18. Reference 27 designates a stopper which stops the movement of the movable contact 13 at a predetermined position, and 28, a compression spring for maintaining the steel ball in position.

Figure 2:
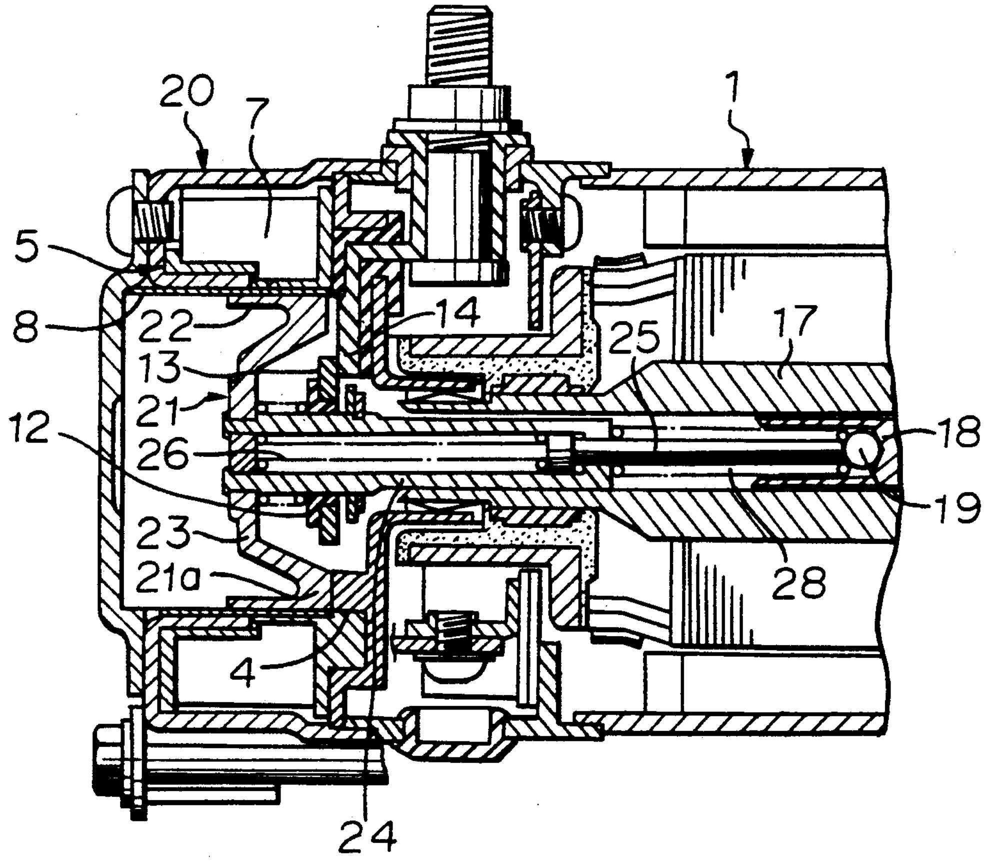
FIG. 2 is a longitudinal cross-sectional view partly broken of the electromagnetic switch shown in FIG. 1, wherein a state of the plunger entirely moved is shown.
Figure 5:
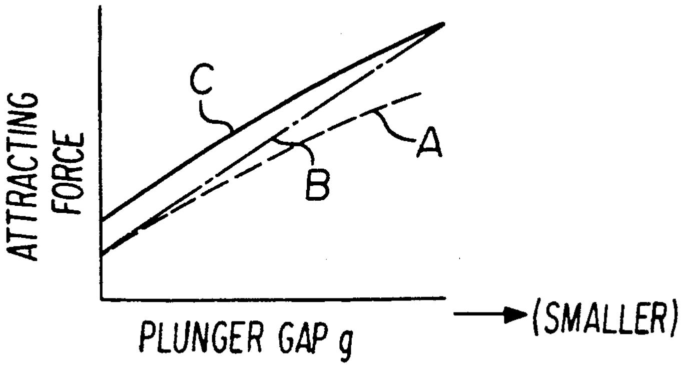
FIG. 5 is a diagram showing a relation of a magnetic attraction force imparted to the plunger to a plunger gap in a conventional electromagnetic switch device and the electromagnetic switch devices as shown in FIGS. 1 and 3.

In the electromagnetic switch device 20 having the construction as described above, when a current is supplied to the exciting coil 7, the plunger 21 is magnetically attracted to move forwardly along the axial direction of the device 20 as shown in FIG. 2. Since the cylindrical body 22 of the plunger 21, which constitutes a part of the magnetic circuit, has a thin-walled portion which extends backwardly from the joined portion 21*a* which connects the radially outer portion of the intermediate plate portion 23, it is difficult for a magnetic flux which pulls back the plunger 21 to be produced between the rear end surface of the cylindrical body 22 and the rear core 5. Accordingly, the force to pull back the plunger is extremely weak, and as a result of this, the rate of increase of an attracting force to the plunger 21 becomes substantially linear. A straight line B in FIG. 5 indicates the attracting force characteristic of the plunger 21 in the electromagnetic switch device 20 as shown in FIG. 1. In the electromagnetic switch device 20 in accordance with the first embodiment of the present invention as shown in FIG. 1, the front end surface of the joined portion 21*a* has a relatively thick wall portion which joins the front end of the cylindrical portion 22 of the plunger 21 to the radially outer portion of the intermediate plate, portion,, 23, receives magnetic attraction force. Accordingly, the front core 4 which faces the front end surface of the joined portion 21*a* has a vertical flat annular portion in the same manner as the conventional device.

Figure 3:
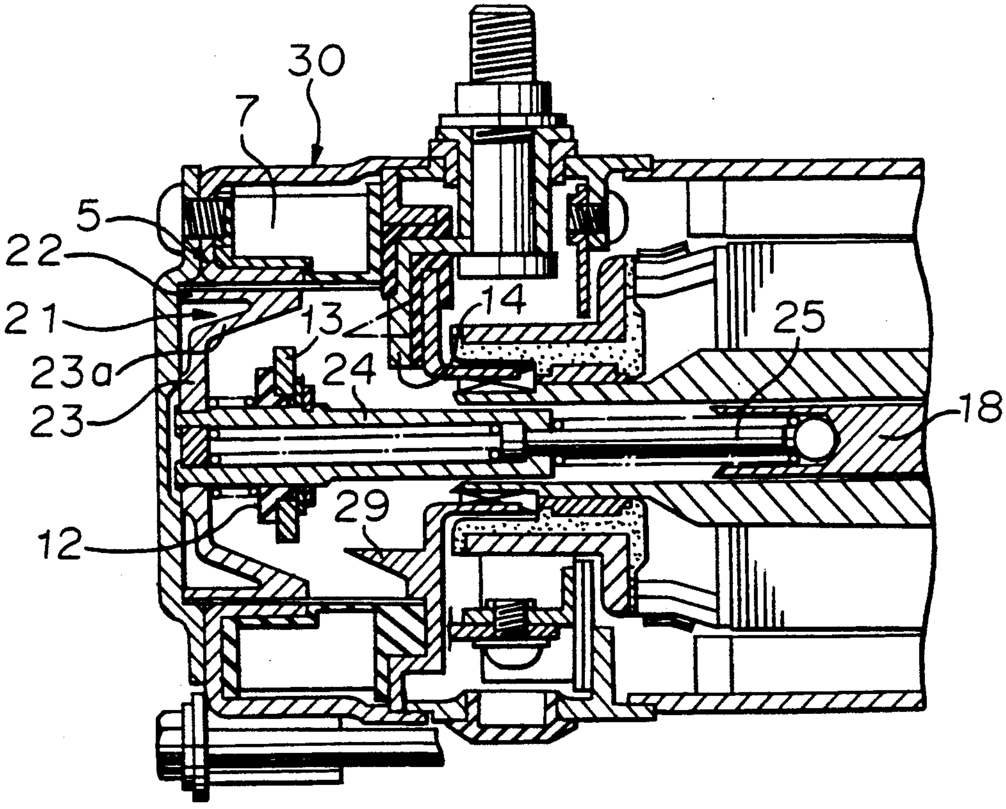
FIG. 3 is a longitudinal cross-sectional view of another embodiment of the electromagnetic switch device of the present invention.

FIG. 3 shows another embodiment of an electromagnetic switch device 30. In this embodiment, the magnetic attraction force can be further improved by forming the plunger 21 and the front core to include a tapered portion 23*a* in the intermediate plate portion 23, having a trumpet shape in cross section, and the outer circumference of the front core, is formed with a partially conical surface 29 corresponding to the tapered portion 23*a*. Namely, the tapered portion 23*a* is formed in the intermediate plate portion 23 of the plunger 21 and the partially conical surface is formed in the front core 29 so that the tapered portion 23*a* and the partially the distance between portions is shortened to thereby obtain a stronger attracting force at the initial stage of attraction. The characteristic curve obtained by this construction is indicated at C in FIG. 5.

Figure 4:
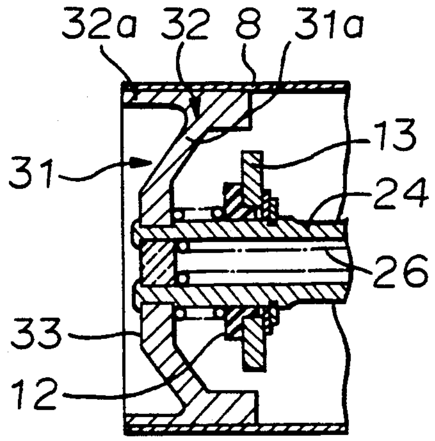
FIG. 4 is a longitudinal cross-sectional view of an important portion of the electromagnetic switch according to another embodiment of the present invention.

In the electromagnetic switch device 20 or 30 as shown in FIG. 1 or 3, the radically outer portion of the intermediate plate portion 23 is joined to the front end portion of the cylindrical body 2. However, they are not limited thereto. For instance, a plunger as shown in FIG. 4 may be used. Namely, a plunger 31 comprises a cylindrical body 32 slidably disposed in the sleeve 8 and an intermediate plate portion 33 which transmits the movement of the cylindrical body 32 to the cylindrical rod 24, wherein the radially outer portion of the intermediate plate portion 33 is joined to the cylindrical body 32 at an intermediate position in the axial direction. A portion of the cylindrical body 32 extending backwardly from the joined portion 31*a* has a thin-walled portion 32*a*. In contrast, in the embodiments of the electromagnetic switch as shown in FIGS. 1 and 2, the entire portion of the cylindrical body 22 has a thin-walled.

As described above, in accordance with the electromagnetic switch device of the present invention, a part of the cylindrical body or the entirety of it has a thin-walled portion which extends backwardly from a joined portion which connects the radially outer portion of the intermediate plate portion to the cylindrical body. Accordingly, the rate of increase of the magnetic attraction force can be improved even when the gap between the plunger and the front core is reduced by the forward movement of the plunger, without increasing the size of the device or decreasing its performance (for instance, without decreasing the initial attracting force).

Obviously, numerous modifications and variations of the present invention are possible in light of the above teachings. It is therefore to be understood that within the scope of the appended claims, the invention may be practiced otherwise than as specifically described herein.

What is claimed is:

1. An electromagnetic switch device which comprises:

an exciting coil wound around a cylindrical bobbin, a sleeve fitted to an inner circumference of the cylindrical bobbin, a plunger disposed in the sleeve so as to be movable in an axial direction of the sleeve by a magnetic attraction force, a cylindrical rod which is movable in association with the plunger, and a movable contact attached to the cylindrical rod which comes into engagement with a fixed contact when the plunger is moved forwardly by the magnetic attraction force, wherein the plunger comprises a cylindrical body slidably fitted to the sleeve, and an intermediate plate portion which generally extends in a plane perpendicular to a central axial line of the cylindrical body, and wherein at least a part of the cylindrical body has a thin-walled portion which extends at least partially in a direction opposite an extension direction of the cylindrical rod from a junction to a radially outer portion of the intermediate plate portion.

2. The electromagnetic switch device according to claim 1, wherein the intermediate plate portion has a trumpet shape in cross section which opens toward the extension direction of the cylindrical rod.

3. The electromagnetic switch device according to claim 1, wherein the junction is formed at an end of the cylindrical body.

4. The electromagnetic switch device according to claim 1, wherein the junction is formed at an intermediate portion of the cylindrical body.

* * * * *